US009820096B2

(12) United States Patent
Heo (10) Patent No.: US 9,820,096 B2
(45) Date of Patent: Nov. 14, 2017

(54) MOBILE TERMINAL, CONTROL METHOD THEREOF, AUDIO/VIDEO/NAVIGATION TERMINAL, VEHICLE MANAGEMENT CENTER, COMPUTER PROGRAM, AND RECORDING MEDIUM

(71) Applicant: Hyundai Motor Company, Seoul (KR)

(72) Inventor: Keun Hang Heo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/964,797

(22) Filed: Dec. 10, 2015

(65) Prior Publication Data

US 2017/0019761 A1    Jan. 19, 2017

(30) Foreign Application Priority Data

Jul. 14, 2015   (KR) .................. 10-2015-0099613

(51) Int. Cl.
*H04W 4/14* (2009.01)
*H04W 4/02* (2009.01)
*H04W 4/04* (2009.01)

(52) U.S. Cl.
CPC .......... *H04W 4/021* (2013.01); *H04W 4/046* (2013.01)

(58) Field of Classification Search
CPC ....................................................... H04W 4/14
See application file for complete search history.

(56) References Cited

U.S. PATENT DOCUMENTS

| 8,581,713 | B1 | 11/2013 | Morgan et al. | |
| 2010/0148947 | A1* | 6/2010 | Morgan | B60R 25/04 340/426.22 |
| 2013/0040600 | A1* | 2/2013 | Reitnour | G01S 19/17 455/404.2 |
| 2013/0332007 | A1* | 12/2013 | Louboutin | H04W 4/021 701/2 |
| 2014/0114794 | A1* | 4/2014 | Wolf | G06Q 30/0643 705/26.5 |
| 2015/0026047 | A1* | 1/2015 | Johnson, Jr. | G06Q 50/30 705/39 |

FOREIGN PATENT DOCUMENTS

| JP | 2004 178495 | 6/2004 |
| JP | 5149692 | 12/2012 |
| JP | 5282835 | 6/2013 |
| JP | 5432534 | 12/2013 |
| KR | 10-2003-0074518 A | 9/2003 |
| KR | 10-2010-0095758 A | 9/2010 |
| KR | 10-2010-0118875 A | 11/2010 |
| KR | 10-1095221 | 12/2011 |
| KR | 10-1130238 B1 | 3/2012 |
| KR | 2013-0029636 | 3/2013 |

* cited by examiner

*Primary Examiner* — Christopher M Brandt
(74) *Attorney, Agent, or Firm* — Mintz Levin Cohn Ferris Glovsky and Popeo, P.C.; Peter F. Corless (57) ABSTRACT

A control method of a mobile terminal for receiving a geofence service of a vehicle from a vehicle management center includes: receiving location information of the vehicle from the vehicle management center, wherein the location information of the vehicle is transmitted to the vehicle management center from the vehicle when the vehicle is started; checking location information of the mobile terminal; and unsetting a function corresponding to a geofence alert event when the location information of the mobile terminal is calculated to be located within a predetermined distance from the location information of the vehicle.

11 Claims, 5 Drawing Sheets

FIG. 5

MOBILE TERMINAL, CONTROL METHOD THEREOF, AUDIO/VIDEO/NAVIGATION TERMINAL, VEHICLE MANAGEMENT CENTER, COMPUTER PROGRAM, AND RECORDING MEDIUM

CROSS-REFERENCE TO RELATED APPLICATION

This application claims the benefit of and priority to Korean Patent Application No. 10-2015-0099613, filed on Jul. 14, 2015, which is hereby incorporated by reference in its entirety as if fully set forth herein.

BACKGROUND OF THE DISCLOSURE

Technical Field

The present disclosure relates generally to a vehicle electronic system and, more particularly, to a mobile terminal, a control method thereof, an audio/video/navigation (AVN) terminal, a vehicle management center, a computer program, and a recording medium, with enhanced user convenience.

Discussion of the Related Art

Due to rapid development of electronic control technologies, a variety of vehicular devices which have previously been mechanically operated can now be electrically controlled, thereby improving convenience and safety. Currently, the concept of a geofence is applied to vehicles. The term "geofence" is a compound word of the prefix "geo," representing the earth, and the word "fence". Together, the term "geofence" refers to a virtual boundary defined around an actual geographic area.

A geofence observer may receive an alert message from a vehicle management center if a monitored vehicle moves beyond of a preset geofence. In general, the alert message may be transmitted to a device registered by the geofence observer. Meanwhile, the geofence observer may be the same as or different from a user of the monitored vehicle. For example, when the geofence observer is different from the user of the vehicle, the geofence observer may be a parent, and the user of the vehicle may be a child.

However, according to conventional technology, an alert message indicating an escape from a geofence is transmitted to a terminal of a geofence observer even when the geofence observer gets in a vehicle, thereby causing a potential inconvenience. Therefore, an enhanced geofence alert system is needed.

SUMMARY OF THE DISCLOSURE

Accordingly, the present disclosure is directed to a mobile terminal, a control method thereof, an audio/video/navigation (AVN) terminal, a vehicle management center, a computer program, and a recording medium which substantially obviate one or more problems due to limitations and disadvantages of the related art.

An object of the present disclosure is to provide a mobile terminal for controlling setting/unsetting of a geofence when a geofence observer gets in a monitored vehicle, and a control method thereof. Another object of the present disclosure is to provide an AVN terminal for controlling setting/unsetting of a geofence when a geofence observer gets in a monitored vehicle. A further object of the present disclosure is to provide a vehicle management center for controlling setting/unsetting of a geofence when a geofence observer gets in a monitored vehicle.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a mobile terminal for receiving geofence service of a vehicle from a vehicle management center includes: receiving location information of the vehicle from the vehicle management center, wherein the location information of the vehicle is transmitted to the vehicle management center from the vehicle when the vehicle is started; checking location information of the mobile terminal; and unsetting a function corresponding to a geofence alert event when the location information of the mobile terminal is calculated to be located within a predetermined distance from the location information of the vehicle.

The unsetting of the function corresponding to the geofence alert event may include: displaying a pop-up window for unsetting the function when the location information of the mobile terminal is calculated to be located within the predetermined distance from the location information of the vehicle; and unsetting the function when a geofence alert unset command is received through the pop-up window.

The unsetting of the function corresponding to the geofence alert event may include: waiting for input for unsetting the function when the location information of the mobile terminal is calculated to be located within the predetermined distance from the location information of the vehicle; and unsetting the function when the input is pre-registered input.

The input for unsetting the function may include at least one of a fingerprint input, an iris information input, and a pattern input.

The control method may further include transmitting a command for requesting not to transmit an alert message for generating the geofence alert event to the vehicle management center after the function corresponding to the geofence alert event is unset.

The function corresponding to the geofence alert event may be performed using a pre-installed application.

The pre-installed application may be executed in background mode.

The vehicle management center may include a vehicle customer relationship management (VCRM) center or a telematics center.

The function corresponding to the geofence alert event may be performed using a pre-installed application.

The application may be executed in background mode.

Furthermore, according to embodiments of the present disclosure, an audio/video/navigation (AVN) terminal includes: an AVN communication unit communicating with a vehicle management center; an AVN interface attempting to establish a communicable connection with a mobile terminal; and an AVN controller controlling the AVN interface to be communicably connected to the mobile terminal when a vehicle is started. The AVN controller transmits location information of the vehicle to the vehicle management center when the attempt to establish the communicable connection with the mobile terminal succeeds and the mobile terminal is a pre-registered geofence terminal or a terminal of a user who has authority to set a geofence.

The AVN controller may control the AVN interface to be communicably connected to the mobile terminal using at least one of a universal serial bus (USB) communication, a Bluetooth communication, and near field communication (NFC).

Furthermore, according to embodiments of the present disclosure, a vehicle management center includes: a wireless communication unit receiving location information of a vehicle, for which a geofence is set, when the vehicle is started; and a controller checking location information of a mobile terminal. The controller provides control not to transmit a geofence alert message to the mobile terminal when the location information of the mobile terminal is calculated to be located within a predetermined distance from the location information of the vehicle and provides control to transmit the geofence alert message to the mobile terminal when the location information of the mobile terminal is not calculated to be located within the predetermined distance from the location information of the vehicle.

Furthermore, according to embodiments of the present disclosure, a non-transitory computer readable medium has program instructions recorded thereon to be executed by a processor to perform the control method described above.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Reference will now be made in detail to the embodiments of the present disclosure, examples of which are illustrated in the accompanying drawings. Like reference numerals in the drawings denote like elements and repeated descriptions thereof will be omitted. The suffixes "module", "---er/or" and "unit" of elements herein are used for convenience of description and thus can be used interchangeably and do not have any distinguishable meanings or functions. In the following description of the present disclosure, a detailed description of known functions and configurations incorporated herein will be omitted when it may make the subject matter of the present disclosure unclear. It should be understood that there is no intent to limit embodiments of the disclosure to the particular forms disclosed, rather, embodiments of the present disclosure are to cover all modifications, equivalents, and alternatives falling within the spirit and scope of the present disclosure.

The terms "first", "second", and the like, herein do not denote any order, quantity, or importance, but rather are used to distinguish one element from another. It will be understood that when an element is referred to as being "connected to" or "coupled to" another element, it can be directly connected or coupled to the other element or intervening elements may be present therebetween. In contrast, when an element is referred to as being "directly connected to" or "directly coupled to" another element, no intervening elements are present.

As used herein, the singular forms "a", "an" and "the" are intended to include the plural forms as well, unless the context clearly indicates otherwise. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

A description of operation of a general geofence alert system is now given before the detailed description of the present disclosure.

A geofence registrant may register a vehicle 20 in a vehicle management center 30, and set a geofence for the vehicle 20. The geofence registrant may or may not be a driver of the vehicle 20. The geofence registrant may set a terminal for receiving geofence alert service, and such terminal is assumed to be a mobile terminal 100.

If the vehicle 20 moves out of the set geofence, the vehicle management center 30 may transmit an alert indicating escape from the geofence to the mobile terminal 100. The detailed description of the present disclosure is now given.

Example of Geofence System

Figure 1:
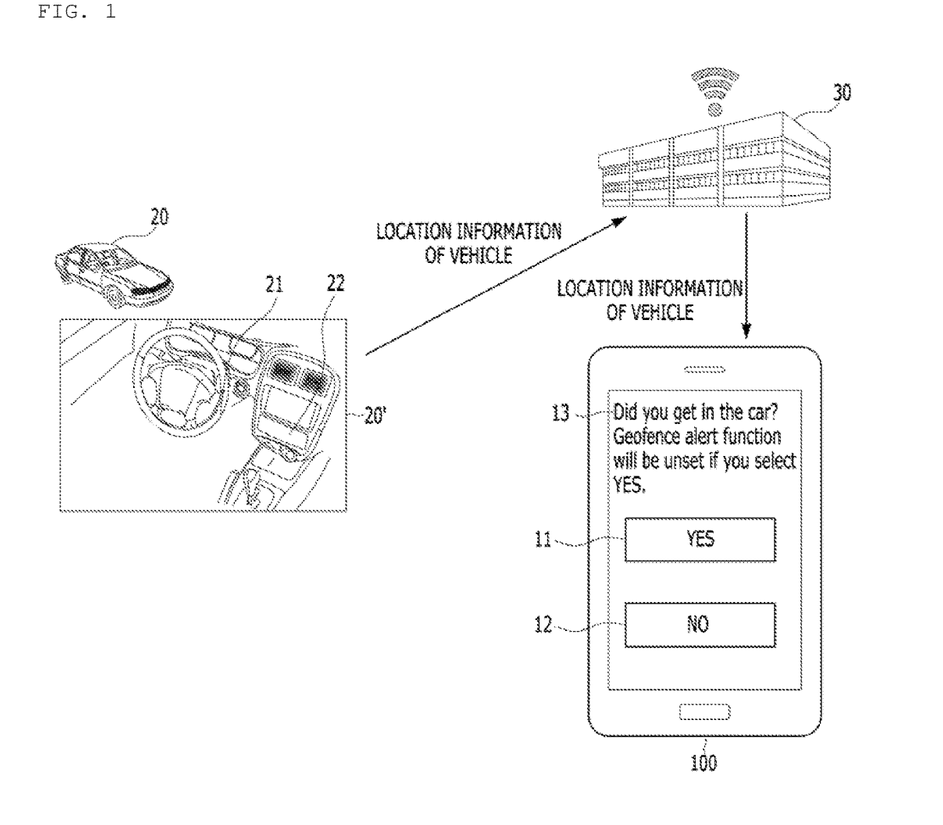
FIG. 1 is a schematic diagram of a geofence alert system to which the present disclosure is applied.

FIG. 1 is a schematic diagram of a geofence alert system to which the present disclosure is applied.

As shown in FIG. 1, the geofence alert system may include a mobile terminal 100, an audio/video/navigation (AVN) terminal 22 of a vehicle 20, and a vehicle management center 30. The term "geofence" means virtual boundaries defined on an actual geographic area as described above.

If the mobile terminal 100 for receiving geofence alert service is in an inner space 20' of the vehicle 20, a geofence alert may not be needed. An example of this case is a case in which a geofence registrant is in the vehicle 20. The geofence registrant may or may not be a driver, and the mobile terminal 100 of the geofence registrant is a device for receiving geofence alert service.

The inner space 20' of the vehicle 20 includes a start button 21 and the AVN terminal 22. When the vehicle 20 is started, the AVN terminal 22 is powered on.

After being powered on, the AVN terminal 22 may receive location information of the vehicle 20 from a global positioning system (GPS) receiver and transmit the location information of the vehicle 20 to the vehicle management center 30.

The vehicle management center 30 may transmit the received location information of the vehicle 20 to the pre-registered mobile terminal 100. The mobile terminal 100 may be a device designated by the geofence registrant.

The mobile terminal 100 receives location information of the mobile terminal 100 when the location information of the vehicle 20 is received.

Upon determining that the location information of the mobile terminal 100 and the location information of the vehicle 20 are within a predetermined distance range, the mobile terminal 100 may unset a geofence alert function even when a geofence alert message is received from the vehicle management center 30. In this case, the mobile terminal 100 may display a pop-up window and wait for user input.

As described above, the mobile terminal 100 may not use geofence alert service if the geofence registrant carrying the mobile terminal 100 is in the vehicle 20.

A description is now given of the structure of the mobile terminal 100 to which the present disclosure is applied.

Architecture of Mobile Terminal

Figure 2:
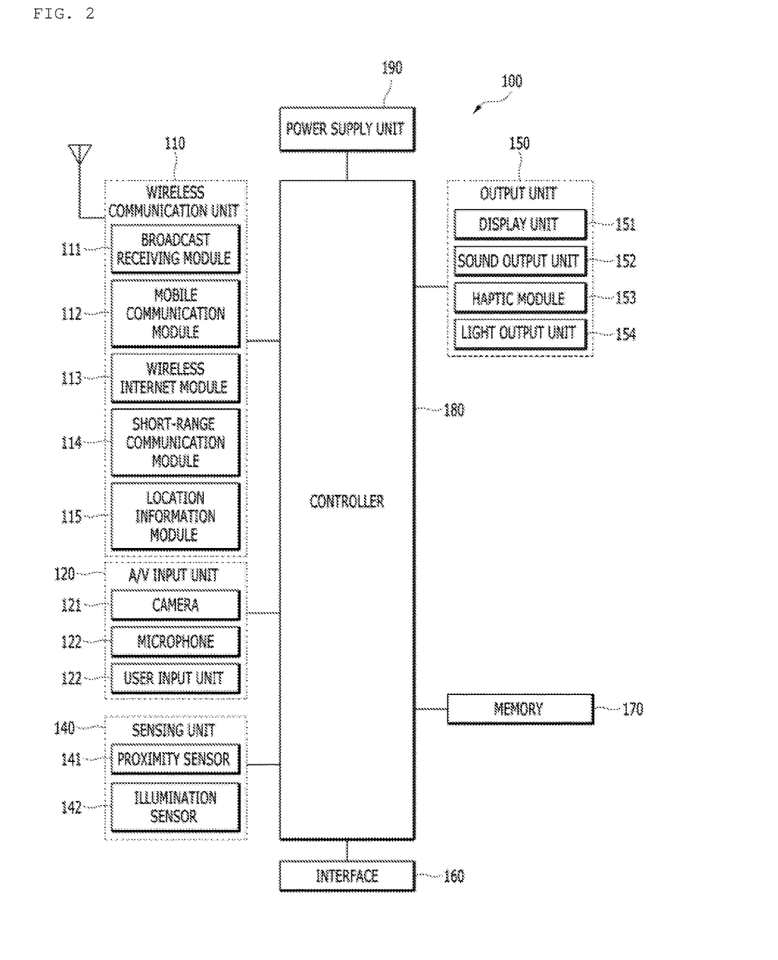
FIG. 2 is a block diagram showing the structure of a mobile terminal capable of unsetting a geofence alert function, according to embodiments of the present disclosure.

FIG. 2 is a block diagram showing the structure of the mobile terminal 100 capable of unsetting a geofence alert function, according to embodiments of the present disclosure. FIG. 2 will be described in conjunction with FIG. 1.

The mobile terminal 100 described in this specification may include a mobile phone, a smartphone, a laptop computer, a digital broadcast device, a personal digital assistant (PDA), a portable multimedia player (PMP), a navigator, a slate PC, a tablet PC, an ultrabook, a wearable device such as a smartwatch, smart glass, a head mounted display (HMD), or the like.

However, one of ordinary skill in the art will easily understand that the configuration described in this specification according to embodiments of the present disclosure is also applicable to a fixed terminal such as a digital TV, a desktop computer, digital signage, or the like, except for features applicable only to a mobile terminal.

The mobile terminal 100 may include a wireless communication unit 110, an input unit 120, a sensing unit 140, an output unit 150, an interface 160, a memory 170, a controller 180, and a power supply unit 190. Since the elements illustrated in FIG. 2 are not essential to implement the mobile terminal 100, the mobile terminal 100 described in this specification may include a larger or smaller number of elements compared to the above-listed elements.

A detailed description is now given of operation of the mobile terminal 100 to which the present disclosure is applied.

Operation of Mobile Terminal

Figure 3:
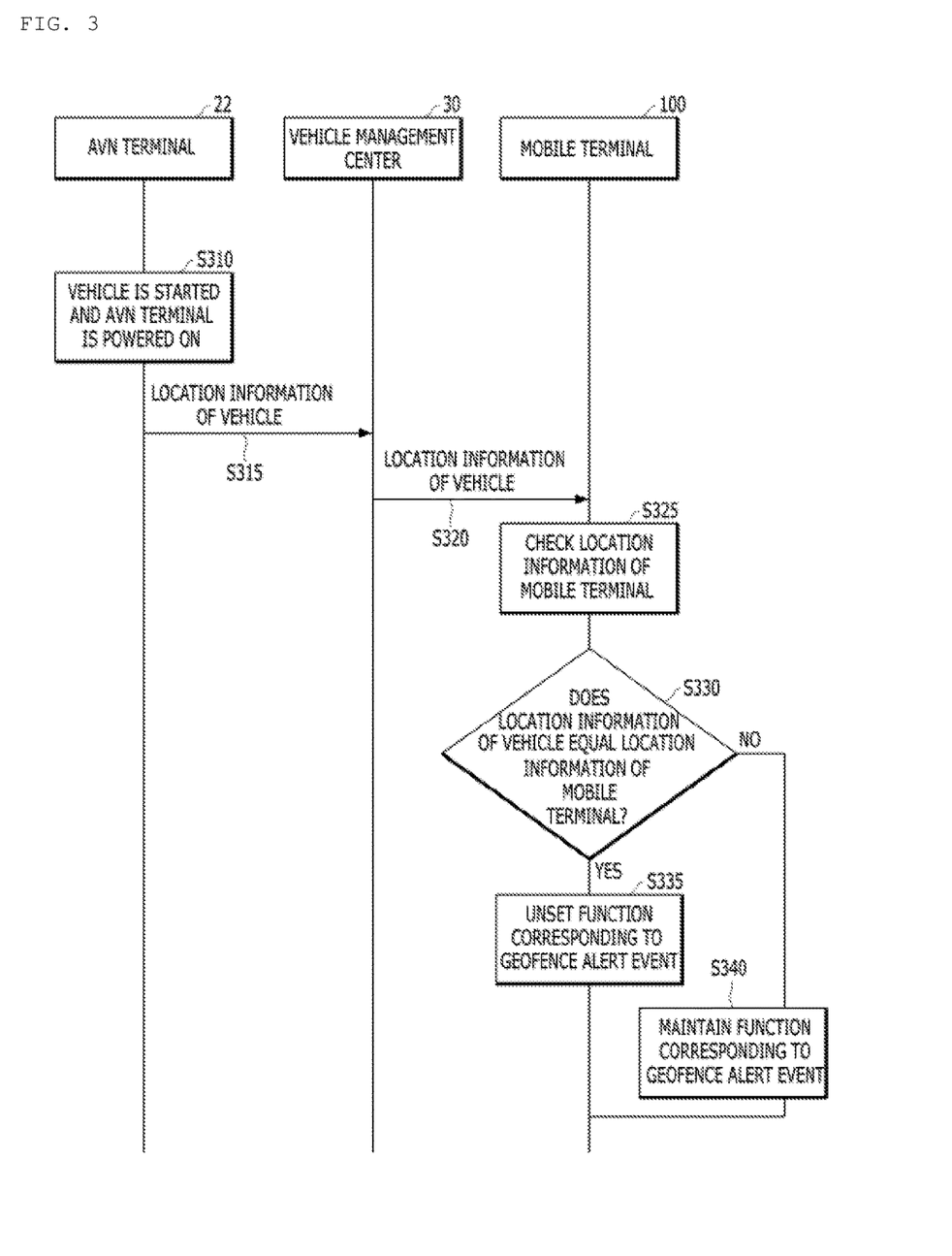
FIG. 3 is a flowchart showing operation of the mobile terminal, according to embodiments of the present disclosure.

FIG. 3 is a flowchart showing operation of the mobile terminal 100, according to embodiments of the present disclosure.

As shown in FIG. 3, when the vehicle 20 is started and the AVN terminal 22 is powered on (S310), the AVN terminal 22 transmits location information of the vehicle 200 to the vehicle management center 30 (S315).

The AVN terminal 22 may communicate with the vehicle management center 30. The AVN terminal 22 may communicate with the vehicle management center 30 using a telematics module, but is not limited thereto.

The vehicle management center 30 may be a telematics center or a vehicle customer relationship management (VCRM) center, but is not limited thereto.

The mobile terminal 100 receives the location information of the vehicle 200 from the vehicle management center 30 (S320).

The mobile terminal 100 may communicate with the vehicle management center 30 through the wireless communication unit 110. Here, the mobile terminal 100 may use a communication network of a communication provider or the Internet, but is not limited thereto.

The mobile terminal 100 checks location information of the mobile terminal 100 (S325). Although S325 is described as being subsequent to S320, S325 may be performed prior to S320.

If the location information of the vehicle 20 equals the location information of the mobile terminal 100 within a predetermined distance range (S330), the mobile terminal 100 unsets a function corresponding to a geofence alert event (S335).

When the vehicle management center 30 transmits a geofence message related to a geofence to the mobile terminal 100, the geofence alert event refers to an event which occurs when the message is received.

Even when a geofence alert event occurs, the mobile terminal 100 may set or unset a function, e.g., alert sound/vibration, corresponding to the alert event. That is, even when the geofence message is received from the vehicle management center 30, if the function corresponding to the alert event is unset, the mobile terminal 100 may not perform the function.

In addition, as described above in relation to FIG. 1, if the location information of the vehicle 20 equals the location information of the mobile terminal 100 within the predetermined distance range (S330), the mobile terminal 100 may display a pop-up window.

Here, the fact that the location information of the vehicle 20 equals the location information of the mobile terminal 100 within the predetermined distance range means that the vehicle 20 and the mobile terminal 100 are located within a preset range (e.g., 10 m). However, the range may be changed by a user.

The mobile terminal 100 may display "Did you get in the car? Geofence alert function will be unset if you select YES." 13, and may unset the function corresponding to the alert event if "YES" 11 is selected.

On the other hand, if "NO" 12 is selected, the mobile terminal 100 may maintain the set function.

Figure 4:
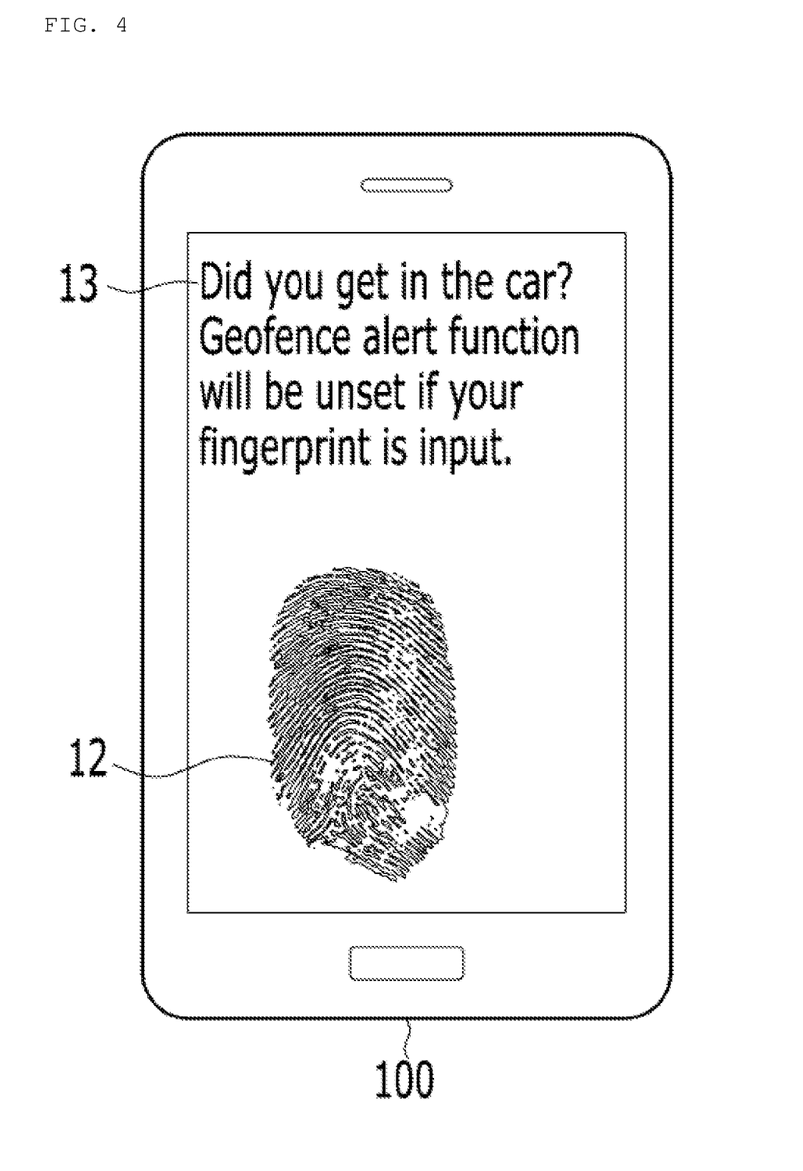
FIG. 4 is an image of the mobile terminal for receiving input of a fingerprint, according to embodiments of the present disclosure.

Meanwhile, as illustrated in FIG. 4, the mobile terminal 100 may unset the function corresponding to the geofence alert event, by receiving input of a fingerprint.

For example, if a parent is a geofence registrant and sets a geofence for the vehicle 20 used by a child, a geofence message is received by the mobile terminal 100 of the parent. In this case, the parent may be a geofence observer, and the mobile terminal 100 of the parent may be a geofence observer terminal.

When the vehicle 20 is started, although the location of the mobile terminal 100 of the parent equals the location of the vehicle 20, the mobile terminal 100 may perform a function corresponding to a geofence alert event only if a fingerprint of the parent is input. As such, security may be improved. Here, iris recognition or pattern recognition may be used instead of fingerprint recognition, but the recognition scheme is not limited thereto.

Referring back to FIG. 3, if the location information of the vehicle 200 does not equal the location information of the mobile terminal 100 within the predetermined distance range (S330), the mobile terminal 100 maintains the function corresponding to the geofence alert event (S340).

For example, if a geofence message is received from the vehicle management center 30, the mobile terminal 100 may output alert sound corresponding to the geofence alert event.

After the function corresponding to the geofence alert event is unset, the mobile terminal 100 may transmit a command for requesting not to transmit an alert message indicating to generate a geofence alert event, to the vehicle management center 30.

The mobile terminal 100 may receive the geofence alert event and perform an operation corresponding thereto, using an application. The application may be downloaded from an application market.

The application may operate in background mode to perform the above function. The mobile terminal 100 may support multitasking for operation in the background mode, but is not limited thereto. Alternatively, the application may operate in stand-alone mode, but is not limited thereto.

A description is now given of another embodiment of the present disclosure.

Operation of Vehicle Management Center

Figure 5:
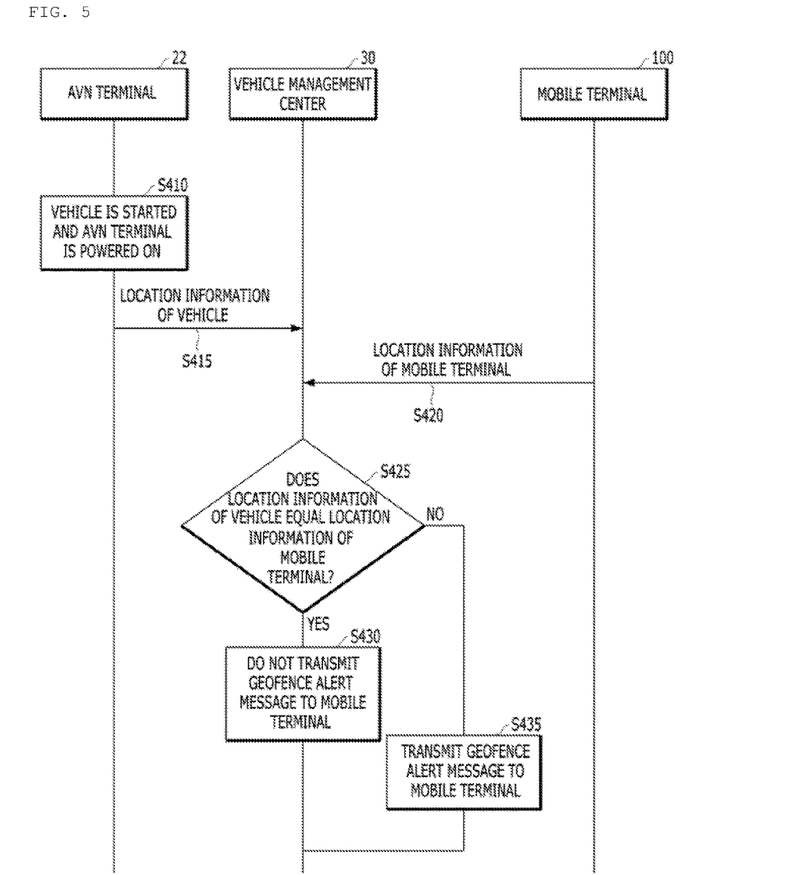
FIG. 5 is a flowchart showing operation of a vehicle management center for controlling a geofence message transmission function, according to embodiments of the present disclosure.

FIG. 5 is a flowchart showing operation of the vehicle management center 30 for controlling a geofence message transmission function, according to embodiments of the present disclosure. Unlike the operation of FIG. 3, in the operation of FIG. 5, the vehicle management center 30 dominantly controls the geofence alert service.

As shown in FIGS. 5, S410 and S415 are the same as S310 and S315 of FIG. 3.

The vehicle management center 30 receives location information of the mobile terminal 100 from the mobile terminal 100 (S420).

If the location information of the vehicle 20 equals the location information of the mobile terminal 100 within a predetermined distance range (S425), the vehicle management center 30 may not transmit a geofence alert message to the mobile terminal 100 (S430).

The vehicle management center 30 may request additional information from the mobile terminal 100. For example, if the location information of the vehicle 20 equals the location information of the mobile terminal 100 within the predetermined distance range in S425, the vehicle management center 30 may request the mobile terminal 100 to input a fingerprint, iris information, or a pattern.

If the location information of the vehicle 20 does not equal the location information of the mobile terminal 100 within the predetermined distance range (S425), the vehicle management center 30 may transmit a geofence alert message to the mobile terminal 100 (S435).

Since the vehicle management center 30 dominantly controls operation for the geofence alert service as described above, device efficiency, communication efficiency, and user convenience may be enhanced compared to a conventional technology.

A description is now given of a method for unsetting geofence alert service at the level of the AVN terminal 22, according to another embodiment of the present disclosure.

Structure and Operation of AVN Terminal

The AVN terminal 22 may include an AVN communication unit, an AVN interface, and an AVN controller.

The AVN communication unit may communicate with the vehicle management center 30. The AVN interface may attempt communicable connection to the mobile terminal 100. The AVN communication unit and the AVN interface are controlled by the AVN controller.

When the vehicle 20 is started, the AVN controller may control the AVN interface to be communicably connected to the mobile terminal 100.

The AVN interface may be connected to an external device (e.g., the mobile terminal 100) through universal serial bus (USB) communication, Bluetooth communication, or near field communication (NFC), but is not limited thereto.

The AVN controller may determine whether the mobile terminal 100 is a preset geofence terminal. The AVN controller may preliminarily register the mobile terminal 100, or ask the vehicle management center 30 whether the mobile terminal 100 is the preset geofence terminal, but is not limited thereto.

In addition, the pre-registered terminal may include a terminal of a user who has the authority to set a geofence. For example, if the user who has the authority to set a geofence sets a geofence of the vehicle 20 using a PC and gets in the vehicle 20, the terminal of the user who has the authority to set a geofence may be the pre-registered terminal.

If the attempt succeeds and the mobile terminal 100 is the geofence terminal, the AVN controller may request the vehicle management center 30 not to transmit a geofence alert message.

If the attempt does not succeed or the mobile terminal 100 is not the geofence terminal, the AVN controller may transmit location information of the vehicle 20 to the vehicle management center 30 through the AVN communication unit.

Subsequent steps are as described above and thus descriptions thereof are not given herein.

As is apparent from the above description, according to various embodiments of the present disclosure, since a mobile terminal for controlling setting/unsetting of a geofence when a geofence observer gets in a monitored vehicle is provided, user convenience may be enhanced.

In addition, since an AVN terminal for controlling setting/unsetting of a geofence when a geofence observer gets in a monitored vehicle is provided, device efficiency and user convenience may be enhanced.

Furthermore, since a vehicle management center for controlling setting/unsetting of a geofence when a geofence observer gets in a monitored vehicle is provided, communication efficiency and user convenience may be enhanced.

It will be appreciated by persons skilled in the art that the effects that could be achieved through the present disclosure are not limited to what has been particularly described hereinabove and other advantages of the present disclosure will be more clearly understood from the above detailed description taken in conjunction with the accompanying drawings.

Accordingly, the above detailed description is not to be construed as limiting the present disclosure in all aspects and be considered by way of example. The scope of the present disclosure should be determined by reasonable interpretation of the accompanying claims and all equivalent modifications made without departing from the present disclosure should be included in the following claims.

What is claimed is:

1. A control method of a mobile terminal for receiving a geofence service of a vehicle from a vehicle management center, the method comprising:
   receiving location information of the vehicle, for which a geofence is set, from the vehicle management center, wherein the location information of the vehicle is transmitted to the vehicle management center from the vehicle when the vehicle is started;
   checking location information of the mobile terminal;
   calculating a distance between the vehicle and the mobile terminal based on the location information of the vehicle and the location information of the mobile terminal;
   determining whether the calculated distance is within a predetermined distance; and
   unsetting a function corresponding to a geofence alert event in response to determining that the calculated distance is within the predetermined distance,
   wherein the unsetting of the function corresponding to the geofence alert event comprises:
      displaying a pop-up window for unsetting the function when the calculated distance between the vehicle and the mobile terminal is within the predetermined distance; and
      unsetting the function when a geofence alert unset command is received through the pop-up window, and
   wherein the mobile terminal has authority to set the geofence.

2. The control method according to claim 1, wherein the unsetting of the function corresponding to the geofence alert event comprises:
   waiting for input for unsetting the function when the location information of the mobile terminal is calculated to be located within the predetermined distance from the location information of the vehicle; and
   unsetting the function when the input is pre-registered input.

3. The control method according to claim 2, wherein the input for unsetting the function includes at least one of a fingerprint input, an iris information input, and a pattern input.

4. The control method according to claim 1, further comprising transmitting a command for requesting not to transmit an alert message for generating the geofence alert event to the vehicle management center after the function corresponding to the geofence alert event is unset.

5. The control method according to claim 1, wherein the function corresponding to the geofence alert event is performed using a pre-installed application.

6. The control method according to claim 5, wherein the pre-installed application is executed in background mode.

7. The control method according to claim 1, wherein the vehicle management center includes a vehicle customer relationship management (VCRM) center or a telematics center.

8. A non-transitory computer readable medium having program instructions recorded thereon to be executed by a processor to perform the control method of claim 1.

9. The control method according to claim 1, wherein the predetermined distance is changeable by a user.

10. A vehicle management center comprising:
    a wireless communication unit receiving location information of a vehicle, for which a geofence is set, when the vehicle is started; and
    a controller checking location information of a mobile terminal, calculating a distance between the vehicle and the mobile terminal based on the location information of the vehicle and the location information of the mobile terminal, and determining whether the calculated distance is within a predetermined distance,
    wherein the controller provides control not to transmit a geofence alert message to the mobile terminal in response to determining that the calculated distance is within the predetermined distance and provides control to transmit the geofence alert message to the mobile terminal in response to determining that the calculated distance is not within the predetermined distance,
    wherein the controller displays a pop-up window when the calculated distance between the vehicle and the mobile terminal is within the predetermined distance, and provides the control not to transmit the geofence alert message to the mobile terminal when a geofence alert unset command is received through the pop-up window, and
    wherein the mobile terminal has authority to set the geofence.

11. The vehicle management center according to claim 10, wherein the predetermined distance is changeable by a user.

* * * * *